(12) United States Patent
Krenzer et al.

(10) Patent No.: US 10,763,475 B2
(45) Date of Patent: Sep. 1, 2020

(54) BATTERY CARRIER FOR AN ELECTRIC BATTERY MODULE OF A VEHICLE

(71) Applicant: Benteler Automobiltechnik GmbH, Paderborn (DE)

(72) Inventors: Harald Krenzer, Kirchheim (DE); Thomas Olfermann, Salzkotten (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 134 days.

(21) Appl. No.: 16/110,564

(22) Filed: Aug. 23, 2018

(65) Prior Publication Data

US 2019/0074494 A1 Mar. 7, 2019

(30) Foreign Application Priority Data

Aug. 24, 2017 (DE) .......................... 10 2017 119 436

(51) Int. Cl.
| | |
|---|---|
| *H01M 2/10* | (2006.01) |
| *B60L 58/24* | (2019.01) |
| *B60L 50/60* | (2019.01) |
| *H01M 10/6556* | (2014.01) |
| *B60L 58/21* | (2019.01) |
| *H01M 10/6557* | (2014.01) |

(52) U.S. Cl.
CPC .......... *H01M 2/1083* (2013.01); *B60L 50/66* (2019.02); *B60L 58/21* (2019.02); *B60L 58/24* (2019.02); *H01M 2/1072* (2013.01); *H01M 10/6556* (2015.04); *H01M 10/6557* (2015.04); *H01M 2200/20* (2013.01)

(58) Field of Classification Search
CPC . H01M 2/1083; H01M 10/6556; B60L 50/66; B60L 58/21; B60L 58/24
USPC ....................................................... 429/100
See application file for complete search history.

(56) References Cited

U.S. PATENT DOCUMENTS

| | | | |
|---|---|---|---|
| 2013/0192046 A1* | 8/2013 | Kerin ..................... | F16L 21/03 29/464 |
| 2017/0176108 A1* | 6/2017 | Palanchon ....... | H01M 10/6556 |

FOREIGN PATENT DOCUMENTS

| | | |
|---|---|---|
| DE | 10 2012 221 503 A1 | 3/2014 |
| WO | WO 2011/061571 A1 | 5/2011 |

\* cited by examiner

*Primary Examiner* — James M Erwin
(74) *Attorney, Agent, or Firm* — Holland & Hart LLP

(57) ABSTRACT

The disclosure relates to a battery carrier for at least one electric battery module in a vehicle, comprising: a hollow profile base configured to receive the electric battery module, wherein the hollow profile base has a plurality of hollow channels configured to allow fluid to pass through to control the temperature of the electric battery module; and a hollow profile side wall that laterally bounds the hollow profile base, wherein a fluid-distributing structure configured to distribute fluid to the hollow channels is formed in the hollow profile side wall, wherein the fluid-distributing structures configured to be fluidically connected to the plurality of hollow channels.

18 Claims, 9 Drawing Sheets

BATTERY CARRIER FOR AN ELECTRIC BATTERY MODULE OF A VEHICLE

CROSS-REFERENCE TO RELATED APPLICATIONS

This application claims priority to German patent application No. 10 2017 119 436.3, entitled "Batterieträger für ein elektrisches Batteriemodul eines Fahrzengs", and filed on Aug. 24, 2017 by the Applicant of this application. The entire disclosure of the German application is incorporated herein by reference for purposes.

BACKGROUND

The present disclosure relates to a battery carrier for a vehicle in particular for an electrically operated vehicle.

In order to accommodate at least one electric battery module for providing electrical energy in electrically driven vehicles, use is customarily made of battery carriers which are arranged in the underbody region between the axles of the vehicle. The battery carriers are customarily designed in such a manner that critical mechanical stresses, for example crash loads, are not transmitted or are transmitted only to a small extent to the battery modules.

For efficient production of battery carriers of this type, use can be made of profile elements which are described in the document DE 10 2012 100 977 B3.

SUMMARY

It is the object of the present disclosure to provide a further efficient battery carrier.

The present disclosure is based on the finding that the above object can be achieved by a battery carrier which comprises a battery carrier, which is efficient to produce, for one or more electric battery modules and has a functionality going beyond the accommodating of the electric components. One such functionality is the controlling of the temperature of the electric components, in particular of one or more electric battery modules, in particular the cooling and/or the heating of the electric battery module. For this purpose, the battery carrier can have a hollow profile base in which hollow channels, through which a fluid can pass, are formed. In order to distribute the fluid to the hollow channels, the battery-carrier side wall, which is configured for mechanical loads, is functionally extended by, for example, a fluid hollow channel or a receptacle for a fluid-distributing tube being formed therein.

According to one aspect, the disclosure relates to a battery carrier for at least one electric battery module in a vehicle, comprising a hollow profile base for receiving the electric battery module, wherein the hollow profile base has a plurality of hollow channels formed therein through which a fluid can pass for controlling the temperature of the electric battery module; and a hollow profile side wall which laterally bounds the hollow profile base, wherein a fluid-distributing structure for distributing fluid to the hollow channels is formed in the hollow profile side wall, wherein the fluid-distributing structure is fluidically connectable to the plurality of hollow channels.

As a result, the structure which is advantageous for distributing fluid can be co-extruded.

The battery module can be, for example, a traction battery of an electric vehicle.

The fluidic connection can take place either directly by means of fluid openings, or indirectly by means of nozzles.

In one example, the fluid-distributing structure extends in the longitudinal direction of the hollow profile side wall and/or is formed to guide the fluid in the longitudinal direction of the hollow profile side wall. The fluid is thereby guided transversely with respect to the direction of extent of the hollow channels, which promotes a distribution of fluid to the hollow channels, in particular in parallel in terms of flow.

In one example, the fluid-distributing structure has fluid openings for the fluidic connection of the fluid-distributing structure to the hollow channels of the hollow profile base. A dedicated fluid opening can be provided here for each hollow channel. However, a plurality of hollow channels can be connected in parallel in terms of flow to the same fluid opening.

In one example, the fluid-distributing structure has at least one fluid hollow channel for guiding the fluid, wherein the fluid hollow channel is formed in the hollow profile side wall and has fluid openings for the fluid connection of the fluid-distributing structure to the hollow channels of the hollow profile base. The fluid hollow channel is therefore formed, for example extruded, in an integrated manner, as a result of which the production costs can be reduced further.

In one example, the fluid-distributing structure is formed by a receiving recess, which is formed in the longitudinal direction of the hollow profile side wall, for receiving a fluid-distributing tube or comprises a receiving recess of this type. The receiving recess can act as a rotary hinge in the event of an impact, for introducing torque.

In one example, a fluid-distributing tube for guiding the fluid is arranged in the receiving recess and is releasably connected to the hollow profile side wall, in particular by means of a clip connection. As a result, the fluid-distributing tube can be fitted in a particularly simple manner.

In one example, the fluid-distributing tube has fluid openings for the fluidic connection of the fluid-distributing tube to the hollow channels of the hollow profile base. The fluid openings can be arranged along the fluid-distributing tube. For the fluid connection, the hollow channels can have fluid nozzles which can be introduced directly into the fluid openings.

In one example, the fluid-distributing structure has two mutually opposite end sides, wherein the fluid-distributing structure is closed in a fluid-tight manner on a first end side and/or wherein the fluid-distributing structure has a fluid connection. In particular a fluid nozzle, on a second end side. The fluid-distributing tube can thereby be fluidically closed and connected in a particularly simple manner.

In one example, the fluid-distributing structure is closed in a fluid-tight manner on the first end side by a closing plate, wherein the closing plate is connected in a force-fitting manner to the fluid-distributing structure. The closing plate can additionally be closed by means of a peripheral seal.

In one example, the fluid-distributing structure faces the hollow profile base, wherein the hollow profile side wall has a deformation region which faces away from the fluid-distributing structure and is provided for absorbing impact energy by means of plastic deformation. The battery module is thereby additionally protected.

In one example, the deformation region has a hollow chamber structure which extends along the hollow profile side wall and is plastically deformable.

In one example, the hollow chamber structure has hollow chambers which lie one above another and are separated by a deformation web, wherein the deformation web is pushable into at least one of the hollow chambers during plastic deformation.

In one example, the hollow profile side wall has a vertical wall extending in a vertical direction of the battery carrier, wherein the deformation region extends at an angle, in particular right angle, from the vertical wall and faces away from the hollow profile base.

In one example, the hollow profile side wall has a supporting web onto which the hollow profile base can be placed or is placed. The battery base can thereby be formed as a separate component.

In one example, the hollow profile base is connected to the supporting web mechanically, in particular in a force-fitting or integrally bonded manner.

BRIEF DESCRIPTION OF THE DRAWINGS

Examples of the present disclosure are described with reference to the attached drawings.

DETAILED DESCRIPTION

Figure 1:
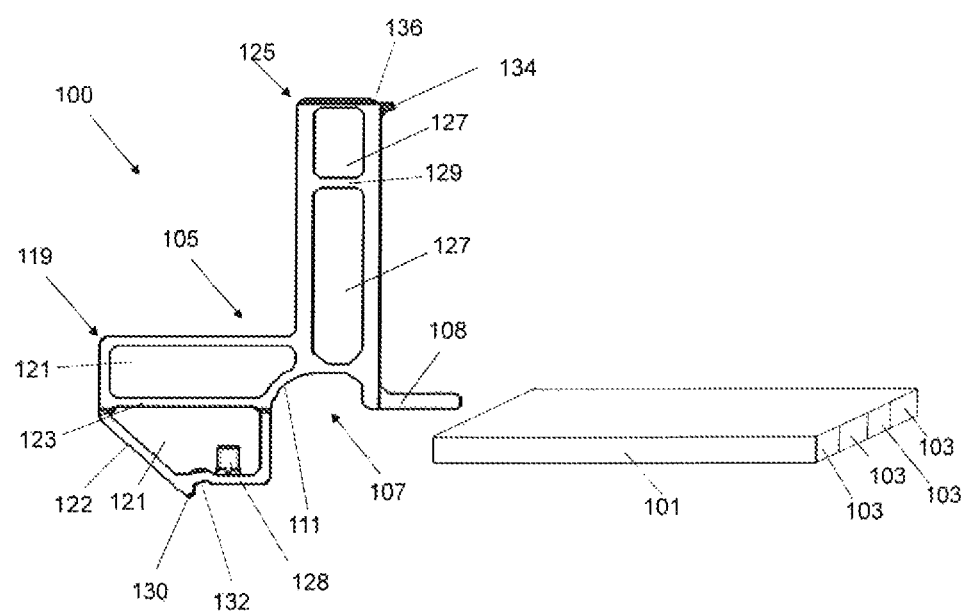
FIG. 1 shows a battery carrier with a hollow profile side wall in one example.

FIG. 1 shows a battery carrier 100 for at least one electric battery module in a vehicle, comprising a schematically illustrated hollow profile base 101 for receiving the electric battery module, wherein the hollow profile base 101 has a plurality of hollow channels 103 formed therein, through which a fluid can pass for controlling the temperature of the electric battery module, and a hollow profile side wall 105 which laterally bounds the hollow profile base 101, wherein a fluid-distributing structure 107 for distributing fluid to the hollow channels 103 is formed in the hollow profile side wall 105, wherein the fluid-distributing structure 107 is fluidically connectable to the plurality of hollow channels 103.

The hollow profile base 101 can be extruded, for example, from aluminium, wherein the hollow channels 103 are co-extruded. As schematically illustrated in FIG. 1, the hollow channels 103 extend over the width of the hollow profile base 101 and run next to one another parallel to the plane of the drawing. On the end side at that end of the hollow profile base 101 which faces away from the hollow profile side wall 105, the hollow channels 103 can be connected to one another in series or in parallel by fluid nozzles in order to bring about loading of the hollow channels 103 by fluid. Alternatively, the hollow channels 103 can be permanently fluidically connected to one another within the hollow profile base 101 by extruded fluid connections.

At that end of the hollow profile base 101 which faces the hollow profile side wall 105, the hollow channels 103 can be provided with fluid nozzles (not illustrated in FIG. 1) which enable fluid to be distributed to the hollow channels 103.

However, the hollow channels 103 can be formed in a looped or meandering manner in the hollow profile base 101 and can be fluidically connected by means of extruded connections within the hollow profile base 101.

The fluid-distributing structure 107 is formed by way of example as a receiving recess 111 or comprises the receiving recess 111, where in the receiving recess 111 can received a fluid-distributing tube (not illustrated). The fluid-distributing tube can have fluid openings into which the nozzles of the hollow channels 103 can be introduced in order to bring about a fluid connection between the hollow channels 103 and the fluid-distributing tube. The fluid-distributing tube can be arranged in the receiving recess 111, for example by means of a clip connection or latching connection.

The receiving recess 111 is formed integrally with the hollow profile side wall 105, for example by extrusion.

The receiving recess 111 can be rounded at least in sections in cross section. As a result, the receiving recess 111 at the same time forms a rotary joint or rotary hinge for introducing torque in the event of an impact.

The hollow profile side wall 105 comprises a vertical wall 125 which extends in a vertical direction of the battery carrier 100, i.e. transversely with respect to the hollow profile base 101 and has at least one cavity or hollow channel 127. The vertical wall 125 forms a sidewall of the battery carrier 100 and runs, for example, over the width or length thereof. The hollow channel 127 runs in the longitudinal direction of the vertical wall 125.

In the exemplary example illustrated in FIG. 1, a plurality of hollow channels 127 which lie one above another and are connected to one another by a web 129 are formed in the vertical wall 125. The hollow channels 127 increase the rigidity of the vertical wall 125.

In one example, a fluid can pass through the hollow channels 127 in order to control the temperature of the battery module (not illustrated) laterally, for example to cool or to heat same. The hollow channels 127 can likewise be fluidically connected to the fluid-distributing structure 107. For this purpose, fluid nozzles which are fluidically connected, for example, to the fluid-distributing tube (not illustrated) can be fitted at the end sides of the hollow channels 127. However, the fluid connections can also be brought about by means of separately guided fluid lines, for example fluid hose lines.

In addition, the hollow channels 127 can be formed to absorb impact energy by deformation.

In one example, the vertical wall 125 comprises a deformation region 119 which extends at an angle, in particular right angle, from the vertical wall 125 and faces away from the hollow profile base 101. The deformation region is provided to absorb impact energy by plastic deformation. For this purpose, a hollow chamber structure is formed in the deformation region 119 with hollow channels 121 or cavities which lie one above another and are separated from one another by a deformation web 123. In the event of a deformation, which is brought about by an impact, of walls surrounding the respective hollow channel 121, the deformation web 123 is pushed into one of the hollow channels 121 as a result of which the impact energy is at least partially absorbed by plastic structural deformation. As a result, the battery module is additionally protected.

The deformation region 119 extends along the hollow profile wall 125.

As is illustrated in FIG. 1, the lower hollow channel 121 is bounded laterally by an obliquely running side wall 122. The side wall 122 is thereby arranged at an angle with respect to a base 124 of the lower hollow channel 121.

The side wall 122 can end with an optional portioning projection 130 which can be followed by a positioning indentation 132.

The vertical wall can correspondingly have a positioning projection 134 and a positioning indentation 136.

In one example, a fastening means 128 is arranged in one of the hollow channels 121, said fastening means serving for fastening the battery carrier 100 to a vehicle component (not illustrated), for example frame.

In the exemplary example illustrated in FIG. 1, the hollow profile base 101 is supported by a web 108. The hollow profile base 101 can rest on the web 108 or can be arranged below the web 108 and can be connected to the web 108, for example, in a force-fitting or integrally bonded manner.

Figure 2A:
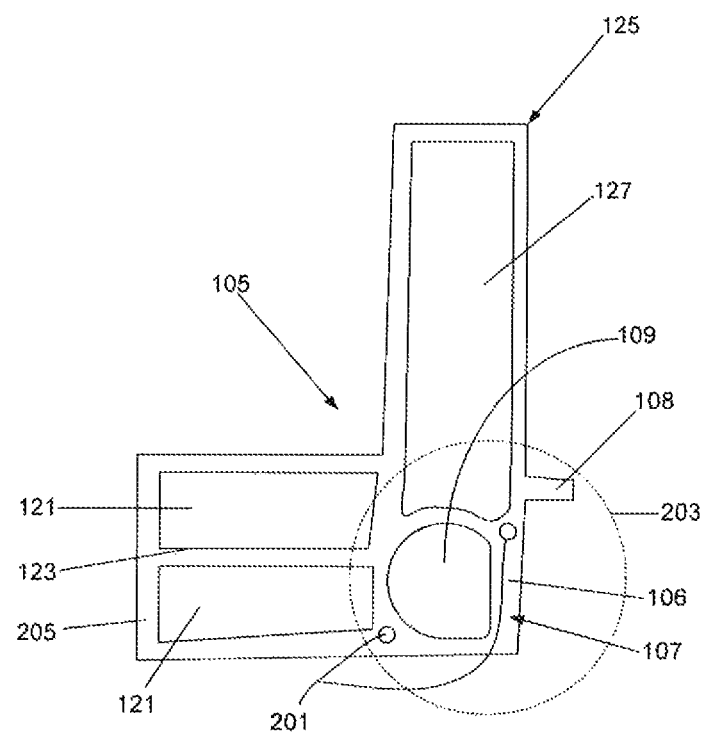
FIGS. 2a, 2b, and 2c show examples of the battery carrier.
Figure 2B:
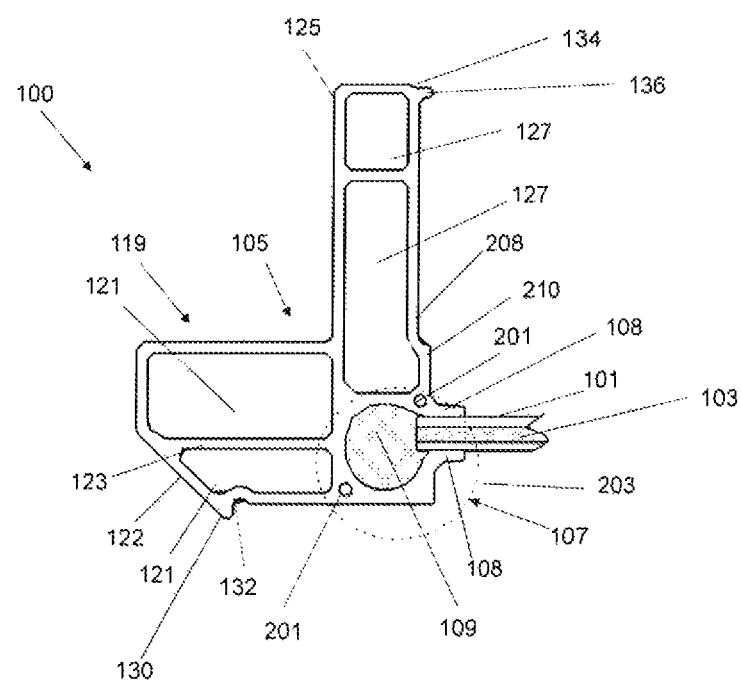
Figure 2C:
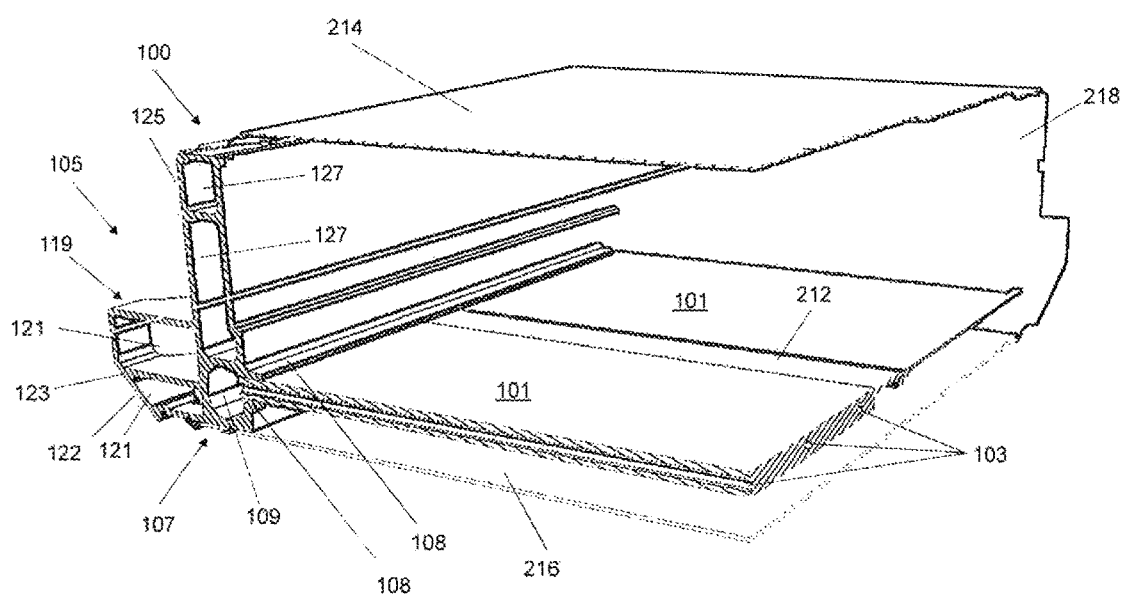

FIGS. 2a, 2b and 2c illustrate further examples of the battery carrier 100.

As is illustrated in FIG. 2a, the fluid-distributing structure 107 has a fluid hollow channel 109 for guiding the fluid. The fluid hollow channel 109 is, for example, extruded and replaces the above mentioned fluid distributing tube which is insertable into the receiving recess 111 illustrated in FIG. 1.

The fluid hollow channel 109 runs, for example, transversely with respect to the direction of extent of the hollow channels 103, which are illustrated in FIG. 2a, of a base plate and is provided for distributing fluid to the hollow channels 103.

The fluid hollow channel 109 can be formed in a round or angular manner at least in sections in cross section. The fluid hollow channel 109 is formed in a fluid-tight manner and, in one example, forms an integrated fluid-collecting line or an integrated fluid tube.

In contrast to the example illustrated in FIG. 1, in the example illustrated in FIG. 2a the lower hollow channel 121 is bounded by a side wall 205 which runs straight and is arranged, for example, at a right angle to a base 207 of the lower hollow channel.

In one example, the fluid hollow channel 109 is open on the end side. For this purpose, the fluid hollow channel 109 can be closed in a fluid-tight manner on a first end side 113.

The fluid-distributing structure 107 can be arranged in the region 203 depending on the configuration of the hollow profile side wall 105.

FIGS. 2b and 2c illustrate further examples of the battery carrier 100.

FIG. 2b illustrates a perspective front view of the battery carrier 100 in one example which has a combination of the features of the examples from FIGS. 1 and 2a. In particular, the battery carrier 100 has the obliquely running side wall 122 and the fluid hollow channel 109.

In the example illustrated in FIG. 2b, the battery carrier 100 has mutually opposite webs 108 which form a receptacle for the hollow profile base 101. The hollow profile base 101 is introduced between the webs 108 in such a manner that the end-side openings, which face the fluid hollow channel 109, of the hollow channels 103 are fluidically connected to the fluid hollow channel 109.

The hollow channels 127 of the hollow profile side wall 105 are bounded on the side facing the hollow profile base 101 by a wall 208 which is set put towards the region 203. As a result, the cross section of the lower hollow channel 107, which lies closer to the region 203 than the upper hollow channel 207, is increased.

FIG. 2c shows an example of the battery carrier 100, with, for example, the hollow profile side wall 105 according to FIG. 2b. The battery carrier 100 can have a plurality of battery bases 101 which are arranged next to one another and are connected to one another, for example, by the connecting elements 212. The connecting element 212 can be connecting plates which, for example, are pushed into lateral grooves of the battery bases 101. However, the connecting elements 212 can also connect the battery bases 101 in a force-fitting manner. The connecting elements 212 can furthermore form latching connections in order to connect the battery bases 101 in a form-fitting manner.

In addition, the battery carrier 100 can be arranged between two plates 214, 216 which enclose the battery carrier 100 in the manner of a sandwich. The plates 216 can be connected laterally by side walls 218 such that the battery carrier 100 can be completely or at least partially enclosed, together with one or more battery modules.

Figure 3A:
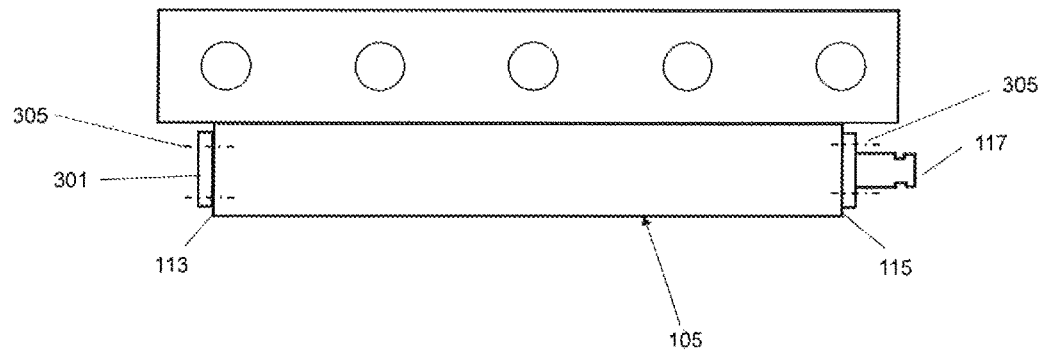
FIGS. 3a and 3b show a cutout of the hollow profile side wall in one example.
Figure 3B:
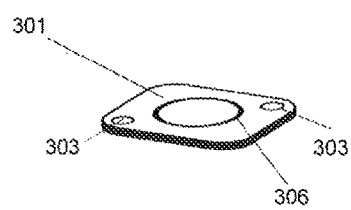

FIGS. 3a and 3b illustrate a view of the hollow profile side wall 105 with a closing plate 301 which covers the fluid hollow channel 109 on the first end side 113 in a fluid-tight manner. The closing plate 301 can be screwed to the hollow profile side wall 105, for example by means of fastening screws 305, which are indicated in FIG. 3a. For this purpose, in the first end side 113 screw channels or threaded openings 201 are formed, the arrangement of which coincides with the arrangement of the aperture 303 formed in the closing plate 301.

The closing plate 301 can optionally be sealed in relation to the first end side 113 by a peripheral seal 306, for example composed of an elastomer.

In one example, the fluid hollow channel 109 is provided on the second end side 115, which faces away from the first end side, with a fluid connection 117, in particular a fluid nozzle, which is provided for loading the fluid hollow channel 109 with fluid.

Threaded openings for the force-fitting fastening of the fluid connection 117 can likewise be provided in the second end side 115.

The end-sides 113, 115 can either be extruded or processed by CNC technology with the threaded openings.

Figure 4:
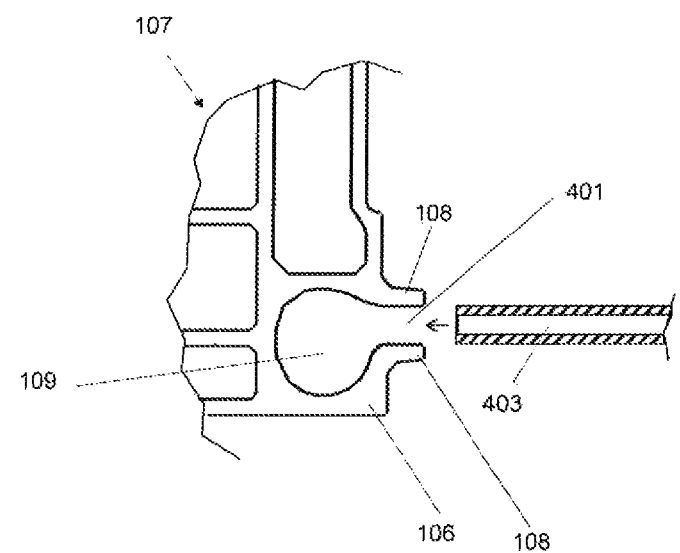
FIG. 4 shows a cutout of the hollow profile side-wall in one example.

In one example, the fluid hollow channel 109 is directly connectable fluidically to the hollow channels 103. For this purpose, the fluid hollow channel 109 has the fluid openings 401 which are illustrated in FIG. 4 and are provided for the fluidic connection to the hollow channels 103. For this purpose, the hollow channels 103 on the end side can have fluid nozzles 403 which can be introduced in a fluid-tight manner into the fluid openings 401. In one example, the fluid openings 401 can each be provided with a peripheral fluid seal, for example composed of an elastomer, in order to increase the fluid tightness of the respective fluid connection.

In one example, the fluid nozzles 403 are provided for direct fitting into the fluid openings 401 forming the outer profile.

The fluid nozzles 403 can be formed in a tube-shaped or tubular manner from aluminium.

The fluid openings 401 can be arranged between mutually opposite webs 108.

Figure 5:
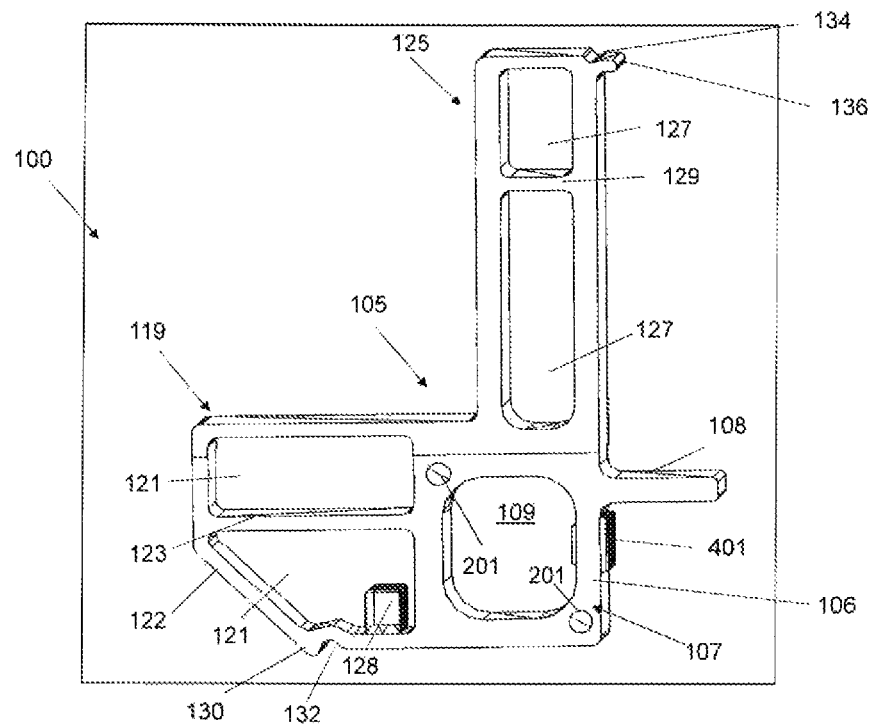
FIG. 5 shows a perspective view of the battery carrier in one example.

FIG. 5 illustrates a perspective front view of the battery carrier 100 in an example which has a combination of the features of the examples from FIGS. 1 and 2. In particular, the battery carrier 100 has the obliquely running side wall 122 and the fluid hollow channel 109.

Figure 6:
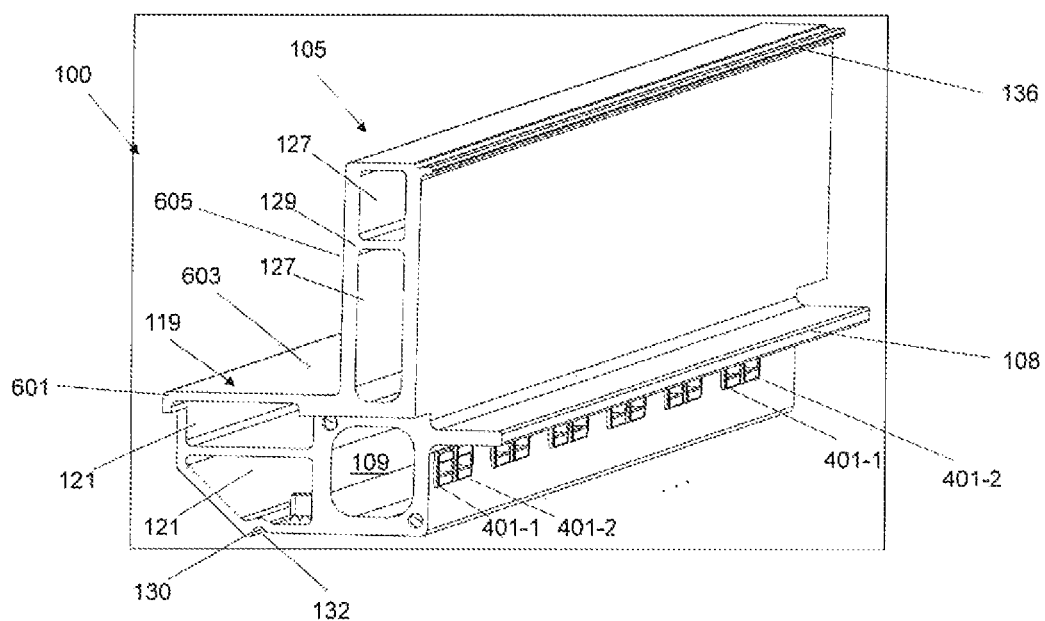
FIG. 6 shows a perspective view of the battery carrier in one example.

FIG. 6 shows a further view of the battery carrier 100 which is illustrated in FIG. 5. As is illustrated in FIG. 6, the upper hollow channel 121 is bounded by a top wall 603 which ends on the end side with a projection 601. The top wall 603 is perpendicular to a side wall 605 which laterally bounds the hollow channels 127.

In the example illustrated in FIG. 6, the battery carrier 100 laterally has fluid openings 401-1, 401-2 which are arranged in pairs and are fluidically connected to the fluid hollow channel 109. Each fluid opening pair 401-1, 401-2 can provide a fluid input and a fluid output.

Figure 7:
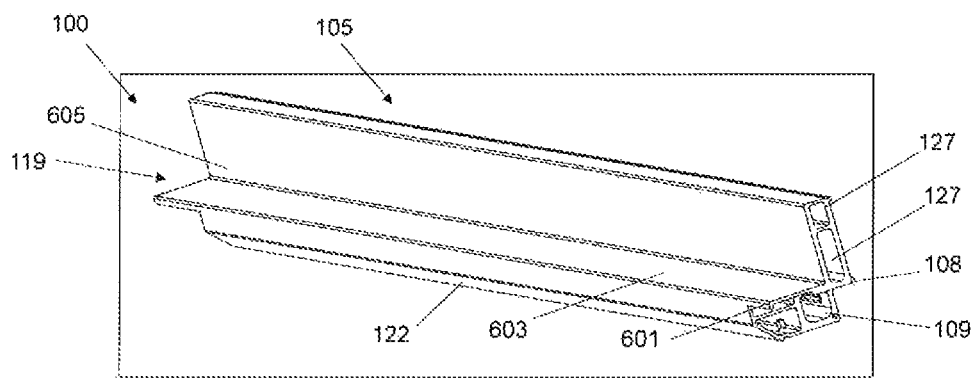
FIG. 7 shows a perspective view of the battery carrier in one example.

FIG. 7 illustrates a further view of the battery carrier 100 which is illustrated in FIG. 6.

What is claimed is:

1. A battery carrier for at least one electric battery module in a vehicle, comprising:
   a hollow profile base configured to receive the electric battery module, wherein the hollow profile base comprises a plurality of hollow channels configured to pass fluid to control a temperature of the electric battery module; and
   a hollow profile side wall that laterally bounds the hollow profile base, wherein a fluid-distributing structure configured to distribute fluid to the hollow channels is formed in the hollow profile side wall, wherein the fluid-distributing structure is configured to be fluidically connected to the plurality of hollow channels;
   wherein the hollow profile side wall comprises at least one web, and the hollow profile base is configured to be placed on the at least one web.

2. The battery carrier according to claim 1, wherein the fluid-distributing structure extends in a longitudinal direction of the hollow profile side wall and is formed to guide the fluid in the longitudinal direction of the hollow profile side wall.

3. The battery carrier according to claim 1, wherein the fluid-distributing structure comprises fluid openings that fluidically connect the fluid-distributing structure to the hollow channels of the hollow profile base.

4. The battery carrier according to claim 1, wherein the fluid-distributing structure comprises a fluid hollow channel configured to guide the fluid, wherein the fluid hollow channel is formed in the hollow profile side wall and comprises fluid openings that fluidically connect the fluid-distributing structure to the hollow channels of the hollow profile base.

5. The battery carrier according to claim 1, wherein the fluid-distributing structure is formed by a receiving recess that is formed in the longitudinal direction of the hollow profile side wall and is configured to receive a fluid-distributing tube.

6. The battery carrier according to claim 5, wherein the fluid-distributing tube configured to guide the fluid is arranged in the receiving recess and is releasably connected to the hollow profile side wall.

7. The battery carrier according to claim 6, wherein the fluid-distributing tube is releasably connected to the hollow profile side wall using a clip connection.

8. The battery carrier according to claim 5, wherein the fluid-distributing tube comprises fluid openings that fluidically connect the fluid-distributing tube to the hollow channels of the hollow profile base.

9. The battery carrier according to claim 1, wherein the fluid-distributing structure comprises two mutually opposite end sides, wherein the fluid-distributing structure is closed in a fluid-tight manner on a first end side and wherein the fluid-distributing structure comprises a fluid connection on a second end side.

10. The battery carrier according to claim 9, wherein the fluid connection comprises a fluid nozzle.

11. The battery carrier according to claim 1, wherein the fluid-distributing structure is closed in a fluid-tight manner on a first end side by a closing plate, wherein the closing plate is connected in a force-fitting manner to the fluid-distributing structure.

12. The battery carrier according to claim 1, wherein the fluid-distributing structure faces the hollow profile base, and wherein the hollow profile side wall comprises a deformation region that faces away from the fluid-distributing structure and is configured to absorb impact energy using plastic deformation.

13. The battery carrier according to claim 12, wherein the deformation region comprises a hollow chamber structure that extends along the hollow profile side wall and is configured to be plastically deformed.

14. The battery carrier according to claim 13, wherein the hollow chamber structure comprises hollow chambers that lie one above another and are separated by a deformation web, wherein the deformation web is configured to be pushed into at least one of the hollow chambers during plastic deformation.

15. The battery carrier according to claim 12, wherein the hollow profile side wall comprises a vertical wall extending in a vertical direction of the battery carrier, and wherein the deformation region extends at an angle from the vertical wall and faces away from the hollow profile base.

16. The battery carrier according to claim 15, wherein the angle comprises a right angle.

17. The battery carrier according to claim 14, wherein the hollow profile base is connected to the at least one web mechanically.

18. The battery carrier according to claim 17, wherein the hollow profile base is connected to the at least one web in a force-fitting or integrally bonded manner.

* * * * *